US010540853B2

(12) United States Patent
Persson et al.

(10) Patent No.: US 10,540,853 B2
(45) Date of Patent: Jan. 21, 2020

(54) HYBRID CASINO DICE GAME

(71) Applicant: ARUZE GAMING (HONG KONG) LIMITED, Hong Kong (HK)

(72) Inventors: Eric Persson, Las Vegas, NV (US); Kenji Enokido, Batangas (PH); Hiroki Munakata, Tokyo (JP); Aaron Huang, Las Vegas, NV (US); Motoya Nakamura, Tokyo (JP); Kenji Hamao, Batangas (PH)

(73) Assignee: Aruze Gaming (Hong Kong) Limited, Hong Kong (HK)

( * ) Notice: Subject to any disclaimer, the term of this patent is extended or adjusted under 35 U.S.C. 154(b) by 0 days.

(21) Appl. No.: 15/963,922

(22) Filed: Apr. 26, 2018

(65) Prior Publication Data

US 2018/0315276 A1 Nov. 1, 2018

Related U.S. Application Data

(60) Provisional application No. 62/490,983, filed on Apr. 27, 2017, provisional application No. 62/562,735, filed on Sep. 25, 2017, provisional application No. 62/573,517, filed on Oct. 17, 2017.

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |

(52) U.S. Cl.
CPC ........ *G07F 17/3288* (2013.01); *G07F 17/322* (2013.01); *G07F 17/3209* (2013.01); *G07F 17/3244* (2013.01)

(58) Field of Classification Search
USPC ........................ 463/1, 16, 17, 20, 22, 39, 40
See application file for complete search history.

(56) References Cited

U.S. PATENT DOCUMENTS

| | | | |
|---|---|---|---|
| 9,098,969 | B2 | 8/2015 | Mulligan |
| 2003/0151198 | A1 | 8/2003 | Parra |
| 2004/0160005 | A1 | 8/2004 | Krise et al. |
| 2006/0068870 | A1 | 3/2006 | Crawford, III et al. |
| 2007/0004510 | A1 | 1/2007 | Underdahl et al. |
| 2007/0045959 | A1 | 3/2007 | Soltys |
| 2007/0145682 | A1 | 6/2007 | Rowe et al. |
| 2007/0259714 | A1 | 11/2007 | Block et al. |
| 2009/0108532 | A1 | 4/2009 | Darling |
| 2009/0118006 | A1 | 5/2009 | Kelly et al. |

(Continued)

FOREIGN PATENT DOCUMENTS

| | | | |
|---|---|---|---|
| FR | 2982109 | A1 | 5/2013 |
| WO | 2000016863 | A1 | 3/2000 |
| WO | 20140140512 | A1 | 9/2014 |

OTHER PUBLICATIONS

International Search Report and Written Opinion dated Jul. 20, 2018 for PCT Application No. PCT/US2018/029652.

*Primary Examiner* — Adetokunbo O Torimiro
(74) *Attorney, Agent, or Firm* — EIP US LLP

(57) ABSTRACT

In one aspect, an improved gaming table, such as a craps table, is disclosed herein, which combines electronic displays and wagering interfaces with traditional craps tables having physical dice and allowing players to physically throw the dice.

20 Claims, 8 Drawing Sheets

(56) References Cited

U.S. PATENT DOCUMENTS

| | | | | |
|---|---|---|---|---|
| 2009/0131151 | A1* | 5/2009 | Harris | G07F 17/32 463/22 |
| 2009/0181744 | A1 | 7/2009 | Yoshizawa | |
| 2010/0130280 | A1 | 5/2010 | Arezine et al. | |
| 2010/0222148 | A1 | 9/2010 | Kuhn | |
| 2010/0279757 | A1 | 11/2010 | Glenn, II et al. | |
| 2011/0115158 | A1 | 5/2011 | Gagner et al. | |
| 2014/0191474 | A1 | 7/2014 | Van Linden | |
| 2014/0361485 | A1* | 12/2014 | Pockaj | G07F 17/326 273/145 E |
| 2016/0012662 | A1 | 1/2016 | Jackson et al. | |
| 2016/0051891 | A1 | 2/2016 | Mulligan | |
| 2017/0084129 | A1 | 3/2017 | Baerlocher et al. | |

* cited by examiner

HYBRID CASINO DICE GAME

CROSS-REFERENCE TO RELATED APPLICATIONS

This application claims the benefit of U.S. Provisional Application No. 62/490,983, filed Apr. 27, 2017, U.S. Provisional Application No. 62/562,735, filed Sep. 25, 2017, and U.S. Provisional Application No. 62/573,517, filed Oct. 17, 2017. Each of the above-referenced patent applications is incorporated by reference in its entirety.

BACKGROUND OF THE INVENTION

Field of the Invention

The present disclosure relates to improvements to gaming tables, such as craps tables, and specifically craps tables that combine electronic displays and wagering interfaces with traditional craps tables having physical dice and allowing players to physically throw the dice.

Description of the Related Technology

Craps is a popular casino game that purportedly is well over 100 years old. Players enjoy playing craps for various reasons, and often times craps tables are the loudest locations in casinos from the excited yelling by its players. Players appear to enjoy the camaraderie of playing against the house while also having the ability to bet with or against other players who may be acting as the shooter.

However, craps games can have significant overhead combined with potential security concerns. Specifically, a typical craps table requires two to three dealers or attendants, who work together to track and settle various bets, retrieve the dice, and generally maintain the order of the table. Additionally, as players are in close proximity to the play area or "play field" of a craps table, significant security assets are dedicated to watching hand movement at the table, especially in the proximity of the various wagers. Craps can also be a slow game, as the attendants are required to track the persons making various bets, determine the results of dice rolls, correctly make payouts where appropriate, and on occasion, replace wagers to their proper locations when they are struck by the thrown dice, which all takes time. Attendants are often asked various questions by players and have to correct player behavior, as craps can appear confusing to the novice player.

Other casino table games have undergone significant automation in recent years, in an effort to improve both efficiency and security. There is an entire sector of the automated games, often referred to as an electronic table game (ETG), or an e-table game. However, attempts to automate craps have not proven successful, primarily because it is believed that one of the most desirable aspects of craps is the physical rolling of the dice by actual players, which place physical limitations on the actual craps table.

SUMMARY

The present disclosure teaches a hybrid craps table that combines elements of automation with the continued use of physical dice thrown by players.

In one embodiment, the craps table comprises a play area which includes a video display that is overlaid by at least one layer of a textile material that allows the images displayed by the video display to be seen. In this embodiment, the textile material works to provide a traditional area for physical dice to be thrown.

In another embodiment, the craps table comprises a plurality of touchscreen player stations, which allow players to wager credits on the craps table without the need for physical chips.

In still another embodiment, the craps table comprises sidewalls or bumpers which also include a video display. In this embodiment, the remainder of the sidewalls or bumpers include bumper padding that works to provide a traditional bumper area for physical dice to be thrown against.

In a further embodiment, the craps table is configured to display various information related to the craps game. Such information may include the craps table layout, the wagers of various players, the result of the last dice throw, the current winning bets, information on how to play craps, bonus contests, alternative wagering options, advertisements, and other information that may improve the player's experience.

In one embodiment, the craps system comprises a play field comprising at least one flat-panel display device arranged horizontally so that images displayed by the at least one flat-panel display are viewable from directly above the at least one flat-panel display; and a play surface comprised of sufficiently translucent textile material, the play surface covering the top horizontal surface of the at least one flat-panel display. This craps system further comprises a bumper wall positioned adjacent to the play field, the bumper wall comprising at least one bumper display device arranged vertically. This craps system also comprises a plurality of player stations, each player station comprising at least one player station memory device, a player station touchscreen, and at least one player station processor in communication with the at least one player station memory device and the player station touchscreen. Continuing with this embodiment, the craps system comprises a dealer station, the dealer station comprising at least one dealer station memory device, a dealer station touchscreen, and at least one dealer station processor in communication with the at least one dealer station memory device and the dealer station touchscreen. This embodiment further comprises at least one game controller memory device and at least one game controller processor, which is configured, with the play field, the bumper wall, the plurality of player stations, the dealer station, and the at least one game controller memory device to cause the play surface to display a craps wagering area, receive a communication from the at least one player station indicating a wager on a next play of craps, cause the play surface to display a representation of the received wager, cause the bumper display device to display a scrolling message indicating that no more bets will be accepted for the next play of craps, send a communication to the dealer station indicating that a player may throw a pair of craps dice, receive a communication from the dealer station that indicates the results of craps dice throw, determine the results of the received wager based on the results of the craps dice throw, when the received wager is determined as a winning wager, cause the play surface to display the awarding of virtual chips, and cause a credit meter associated with the at least one player station to increment based on the determined winning wager, and when the received wager is determined as a losing wager, cause the play surface to display the removal of the displayed representation of the received wager, and continue play.

Figure 1:
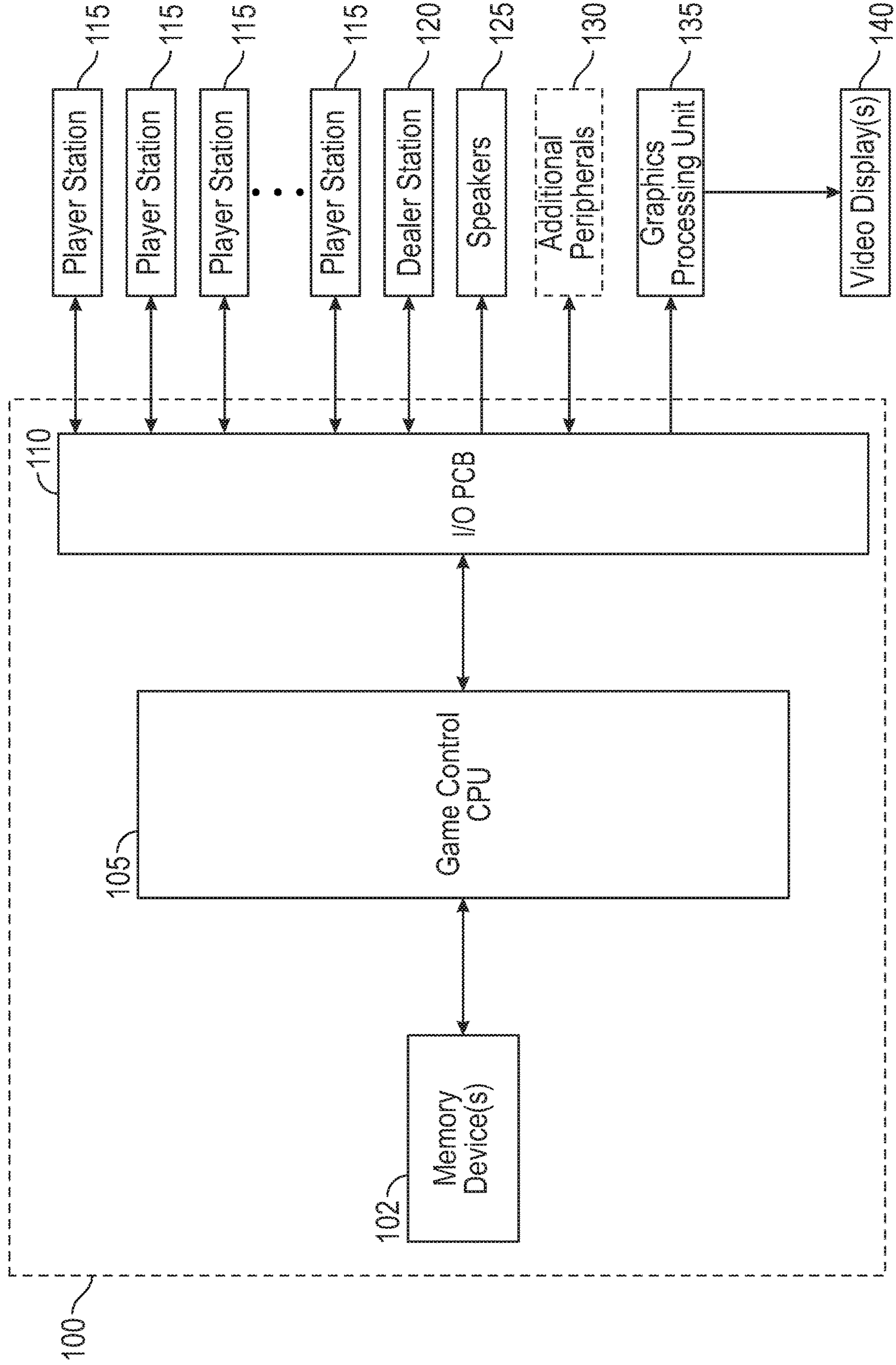
FIG. 1 is a schematic view of a hybrid craps table, according to one embodiment of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples consistent with the description; however, the description is not limited to the examples provided in the drawings.

DETAILED DESCRIPTION OF CERTAIN INVENTIVE EMBODIMENTS

Referring to FIG. 1, a schematic view of one embodiment of the hybrid craps table is displayed. Arrowed lines are shown to generally illustrate the contemplated flow of communications between components.

It is contemplated that a hybrid craps table may have at least one secure area 100 to house sensitive components. While FIG. 1 illustrates several components within secure area 100, it is contemplated that additional components can be located within secure area 100 or that additional secure areas can be associated with the hybrid craps table. In FIG. 1, at least one game controller memory device 102 is in communication with a game control central processing unit (CPU) 105. Game Control CPU 105 can perform arithmetic and logical operations, and also extract instructions from game controller memory device(s) 102 and decode and execute them. Game control CPU 105 may comprise at least one processor. Alternatively, it is contemplated that instead of CPU 105, an array processor or vector processor having multiple parallel computing elements, which utilizes a distributed computing model, may be used to perform such arithmetic and logical operations. The game control CPU 105 may also be referred to as a game controller herein.

Game controller memory device(s) 102 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the game controller memory device(s) 102 includes read only memory (ROM), which may, for example, store regulatory-sensitive instructions for the hybrid craps table. In one embodiment, the game controller memory device(s) 102 includes flash memory and/or EEPROM (electrically erasable programmable read only memory). Any other suitable magnetic, optical and/or semiconductor memory may operate in conjunction with the hybrid craps table disclosed herein.

In some embodiments, game controller memory device(s) 102 store program code that is executable by game control CPU 105. Game controller memory device(s) 102 may also store operating data, such as a random number generator (RNG), game instructions, event data, display files, game history data, and other such data and instructions that allow for a gaming device to properly function in a regulated environment.

Game Control CPU 105 is communicatively connected to at least one input/output printed circuit board (I/O PCB) 110 which operates as an electrical interface between Game Control CPU 105 and access stations and various peripherals of the hybrid craps table. FIG. 1 further illustrates communicating with a plurality of player stations 115, and at least one dealer station 120. In one embodiment, player stations 115 are the primary mechanism for the placement and settlement of wagers on the hybrid craps table. In another embodiment, at least one dealer station 120 allows the dealer to manage the craps game played at the hybrid craps table, as discussed more below.

FIG. 1 also illustrates other contemplated peripherals, including speakers 125, and other additional peripherals 130. Also illustrated is a graphic processing unit (GPU) 135, which works in coordination with game control CPU 105 to control the video display(s) 140 contemplated herein, and causes them to display various aspects of a game.

Figure 2:
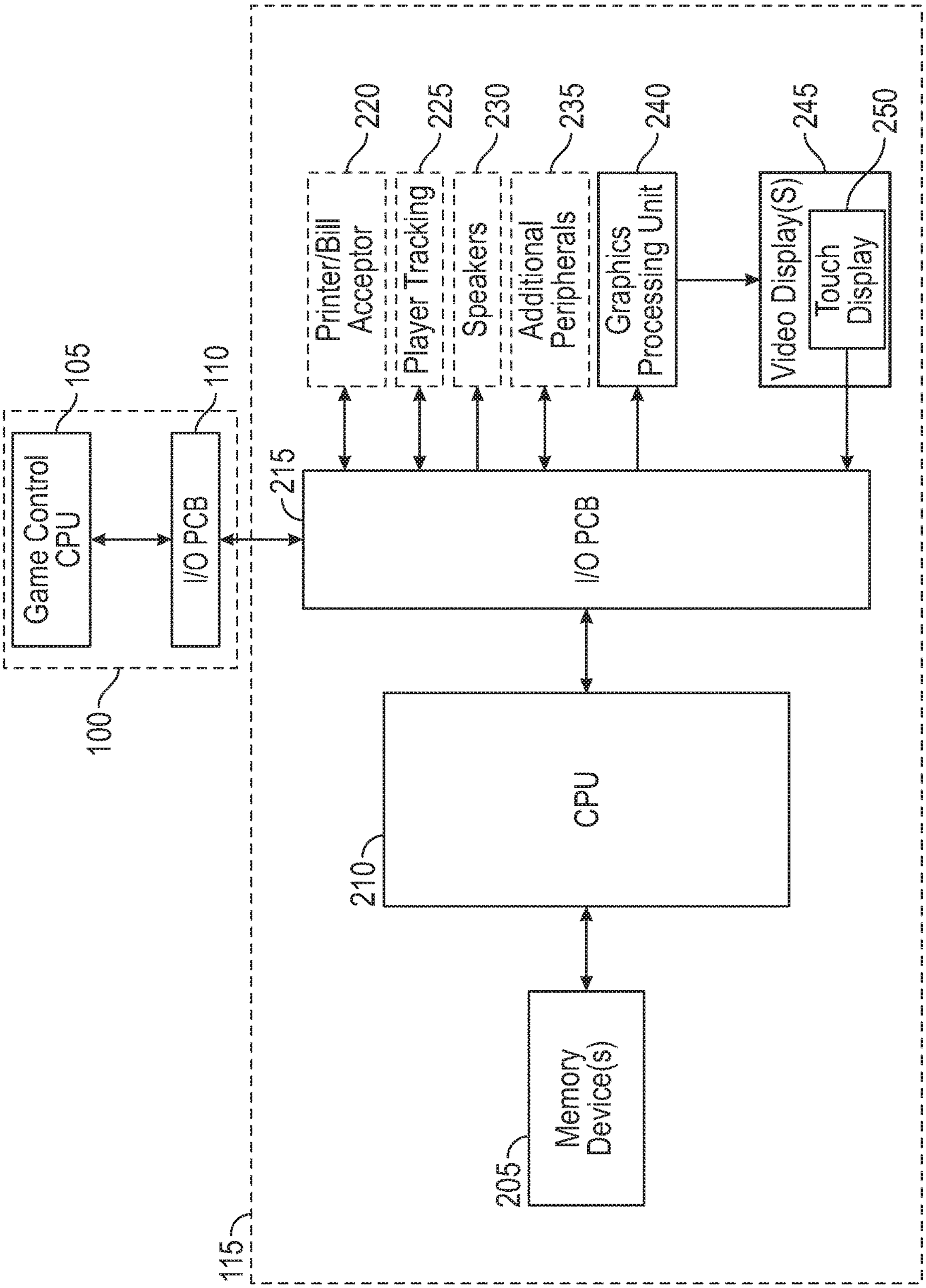
FIG. 2 is a schematic view of a player station, according to one embodiment of the present disclosure.

FIG. 2 is a schematic illustration of one contemplated embodiment of a player station 115. In this embodiment, at least one player station memory device 205 is in communication with a player station CPU 210. Player station CPU 210 can perform arithmetic and logical operations, and also extract instructions from player station memory device(s) 205 and decode and execute them. Player station CPU 210 may comprise at least one processor. Alternatively, it is contemplated that instead of player station CPU 210, an array processor or vector processor has multiple parallel computing elements, which utilizes a distributed computing model, to perform such arithmetic and logical operations. The player station CPU 210 may also be referred to as a player station controller herein.

Player station memory device(s) 205 can include one or more distinct types of memory devices, such as random access memory (RAM) or dynamic RAM (DRAM), which can include non-volatile RAM (NVRAM), magnetic RAM (MRAM), ferroelectric RAM (FeRAM) and other forms as commonly understood in the computing industry. In one embodiment, the player station memory device(s) 205 includes read only memory (ROM), which may, for example, store regulatory-sensitive instructions for the hybrid craps table. In one embodiment, the player station memory device(s) 205 includes flash memory and/or EEPROM (electrically erasable programmable read only memory). Any other suitable magnetic, optical and/or semiconductor memory may operate in conjunction with player station 115.

In some embodiments, player station memory device(s) 205 store program code that is executable by player station CPU 210. Player station memory device(s) 205 may also store operating data, such as an RNG, game instructions, event data, display files, game history data, and other such data and instructions that allow for a gaming device to properly function in a regulated environment.

Player station CPU 210 is communicatively connected to at least one input/output printed circuit board (I/O PCB) 215, which operates as an electrical interface between player station CPU 210 and the game control CPU 105 via the I/O PCB 110, and various peripherals of player station 115. FIG.

2 further illustrates communicating with a plurality peripherals, such as a printer/bill acceptor 220. It is contemplated that by incorporating a printer/bill acceptor 220, casinos can do away with traditional betting chips as are common on typical craps tables. This can provide numerous benefits to casinos, including improving security as then all wagers and payouts can be tracked electronically. This can also provide a cleaner table surface for throwing dice, as there are no chips that may be accidentally hit by thrown dice. It is also contemplated that similar benefits can be derived from a system where the player station 115 does not include a printer/bill acceptor, but rather the dealer station 120 does. In such an embodiment, a player can hand their money to the dealer/attendant, who inputs the transaction into dealer station 120, which can then cause the appropriate player station 115 to be credited with the proper amount of credits, which the player can then use to wager and play with.

FIG. 2 also illustrates the contemplated inclusion of a player tracking peripheral 225. Currently, if casinos want to take on the burden of tracking craps players, attendants at craps tables typically estimate the amount of play by any particular player, and must then manually input such estimation into an associated player tracking manager system. However, such systems are hard to properly run and can lead to players having their play/wagers underreported or overreported, which are both detrimental to a casino's player tracking program. In the current embodiment, by allowing players to immediately associate their play with their player tracking account, for example by inserting their player tracking card into the player tracking peripheral 225, they are able to be accurately monitored. This can lead to both reduced costs for casinos, as they will only provide awards to players who actually meet their award criteria, and increased enjoyment by players, as their level of play will accurately be recorded, which can lead to increased awards.

FIG. 2 also illustrates other contemplated peripherals, including speakers 230, and other additional peripherals 235. Also illustrated is a graphic processing unit (GPU) 240, which works in coordination with player station CPU 210 to control the video display(s) 245 of the player station 115, and causes them to display various aspects of a graphical user interface (GUI) for the hybrid craps table. It is further contemplated that the video display(s) 245 include a touch display 250, also referred to as a touchscreen, which is configured to receive various inputs from a player. As illustrated in FIG. 2, it is contemplated touch display 250 is configured to communicate back to player station CPU 210 via I/O PCB 215. In one embodiment, the touch display 250 would allow a player to touch portions of the screen in order to input selections or other commands.

Figure 3:
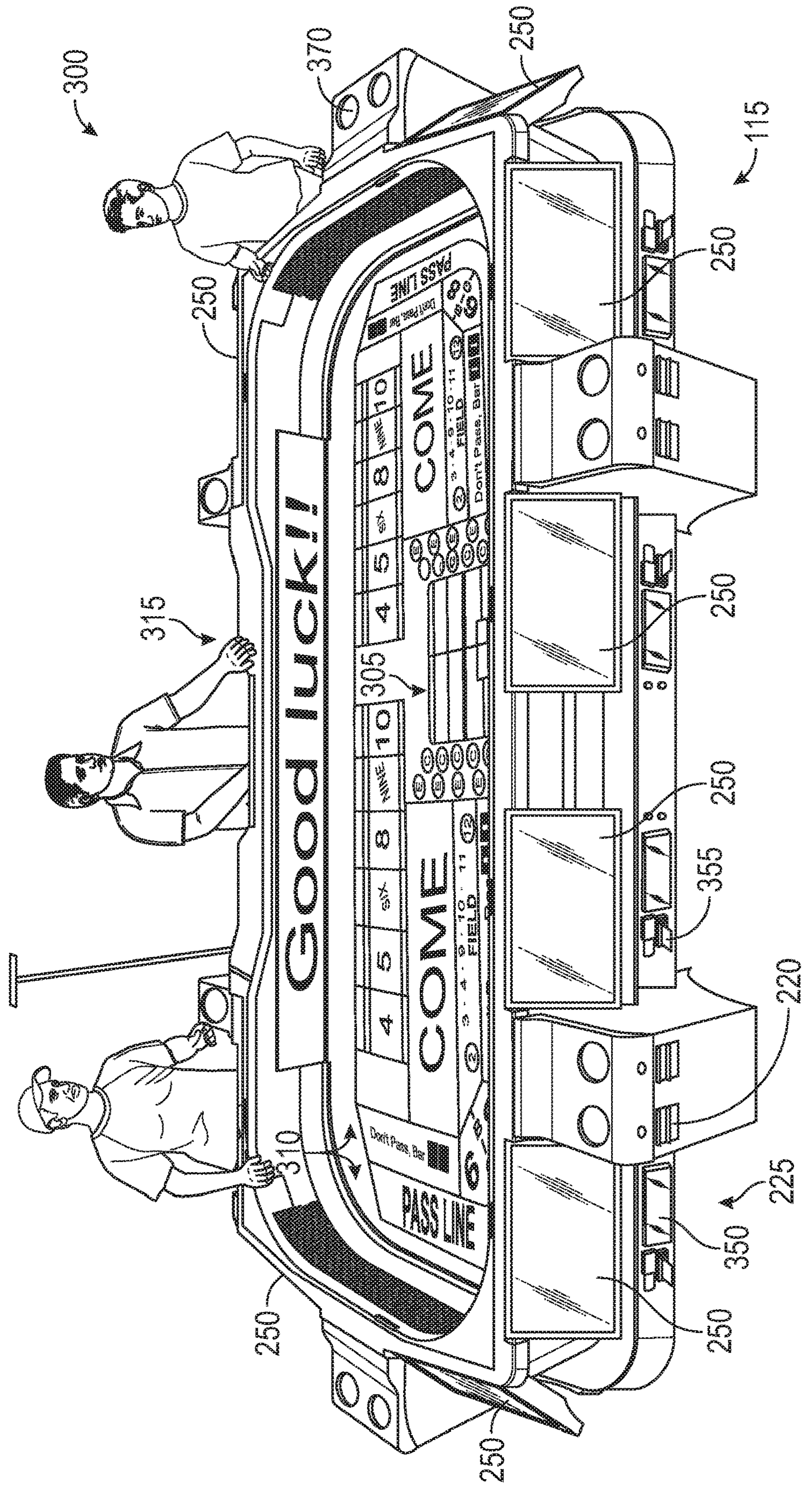
FIG. 3 is a perspective view of a hybrid craps table, according to one embodiment of the present disclosure.

FIG. 3 illustrates a hybrid craps table in accordance with one embodiment, generally shown at 300. Craps is a well-understood game in the field of casino gaming, and the various typical bets available are not discussed in detail here. However, it is understood that a craps table layout will generally include a wagering area, generally shown at 305, and then the remainder of the table area, generally shown at 310. Collectively, these are often referred to as the play field, as this is where the dice are thrown. There is also generally a specific area for the attendants, generally shown at 315. As is evident from FIG. 3, craps table 300 can be quite large, which can present several challenges for players. One challenge might be to visually see what the rolled dice actually land on, as the dice are small and can be thrown towards the opposite end of the table. Another challenge can be to place the wagers on all of the bets a player desires to wager on, as the player may not be able to reach each wagering area 305. This is another reason that typical craps tables have multiple attendants, so that they can facilitate such wagers from their central location.

Hybrid craps table 300 is illustrated with several player stations 115. It is contemplated that each player station 115 is positioned around the perimeter of the hybrid craps table 300 in a manner to allow players to utilize the player station 115 while also having the ability to view the playing surface of the hybrid craps table 300. It is also contemplated that at least certain player stations 115 should be sized and positioned in a manner so as to allow a player to also throw dice. In another embodiment, player station 115 may be moveably connected to the hybrid craps table 300, so as to allow it to be moved slightly to allow better access for a player to throw the dice. In a further embodiment, portions of player station 115, for example touch display 250, may be moveably connected to the hybrid craps table 300.

In the present embodiment, each player station 115 is comprised of a printer/bill acceptor 220. In this example, the printer/bill acceptor 220 is configured to accept tangible mediums of currency, such a physical/paper bills and tickets. In another embodiment, printer/bill acceptor 220 may be comprised of multiple components, such as a separate currency acceptor and printer. In such an embodiment, the currency acceptor may be a coin acceptor that accepts coins. In still another embodiment, hybrid craps table 300 includes more than one currency acceptor, such as one for coins, one for paper bills, and/or one for tickets. In another embodiment, printer/bill acceptor 220 can accept multiple denominations of currency, or even currencies from multiple countries. In still another embodiment, printer/bill acceptor 220 can accept a ticket or similar physical indicium that is distributed by a casino or another gaming machine, which indicates an amount of currency available for wagering. In a further embodiment, printer/bill acceptor 220 can accept credit cards, debit cards, prepaid cards, or other instruments to initiate an electronic funds transfer. It is also contemplated that instead of a printer/bill acceptor 220, the hybrid craps table 300 provides another means to allow a player to access money in order to wager on a play of the game. For example, the player may enter a personal identification number (PIN) in order to access an account they have, either with a bank or the casino itself, and upon entering the PIN and other information, certain amount of funds are transferred to the player station 115 or otherwise allowed to be wagered in relation to hybrid craps table 300. In another embodiment, printer/bill acceptor 220 is configured to interact with a radio frequency identification (RFID), a Bluetooth, a near-field communication (NFC), a WiFi, and/or other short-range or medium-range communication device which can transmit financial information short and/or medium distances, for example a bracelet, smart watch, smart phone, or other similar devices.

Player station 115 also includes an input device, such as touch display 250, which allows a player to input commands, such as placing a wager on a play of a craps game. In another embodiment, player station 115 includes other input devices, such as physical buttons. In a further embodiment, touch display 250 is a multi-touch display.

Player station 115 is also shown with a player tracking device, generally shown at 225. In this example, player tracking device includes player tracking card reader 355, and player information display 350. It is contemplated that such a player information display 350 can be utilized to communicate with the player. It is contemplated that such player information display 350 can be a liquid crystal display (LCD), a plasma display, an electroluminescent (EL) display, an organic light emitting diode (OLED) display, an LED dot matrix type of display, or can be any other type of display suitable for smaller displays. It is contemplated that player station 115 can include a visibly distinct player tracking device 225, or a visually integrated player tracking device that utilizes a portion of video display and possibly also an associated touch display in order to interact with a player. In practice, a player makes their identity known to the player tracking device 225, either actively by inserting a player tracking card into a player tracking card reader 355 and/or entering a PIN into an associated keypad or a touch interface incorporated with player information display 350, or passively by utilizing a location device, such as an RFID tag, a Bluetooth, a near-field communication (NFC), a WiFi, and/or other short-range or medium-range communication device which can transmit information short and/or medium distances, for example a bracelet, smart watch, smart phone, or other similar devices. Thereafter, the player tracking device 225 communicates over a network with a casino tracking system to track a player's play, and potentially offer awards or other services to the player, often through the same player tracking device 225. The player tracking device 225 can also display, via player information display 350, player status information back to the player, or other information based on or otherwise related to a player's play history and/or status, including awards earned by a player. It is also contemplated that the networked player tracking device 225 can be utilized to offer other services to players, such as the ordering of drinks, or making promotional offers to a player, perhaps working in coordination with printer/bill acceptor 220 to do so.

It is also contemplated that hybrid craps table 300, as disclosed herein, facilitates the use of promotional or non-cashable credits on a play of craps. As craps games have historically been hard to automate, providing players the ability to wager with promotional credits has proven difficult and inefficient. However, with providing the ability to accept electronic wagers, the hybrid craps table provides an efficient way to allow a player to redeem and wager such promotional credits. For example, a player may receive notification on the player information display 350 of a number of promotional credits they are able to redeem. The player may then input, via a touch display associated with player information display 350, their desire to redeem such promotional credits, which may then be communicated to a promotional credit meter associated with player station 115, for example displayed on touch display 250. The player may then wager the credits on various craps bets, and any winnings may then be added to a regular credit meter associated with player station 115. The player may then cash out such credits derived from winning wagers.

Hybrid craps table 300 is also illustrated with integrated drink areas 370. It is contemplated that drink areas 370 should advantageously be placed close to player station 115, but should also be in an area where an accidental spill will not affect sensitive components of the hybrid craps table 300. By providing drink area 370 atop printer/bill acceptor 220, combined with a depression to help collect minor spills and/or condensation, it is contemplated that damage from any such spills is minimized.

In one embodiment, hybrid craps table 300 includes a cover, such as a dome, over the play field which allows the viewing of the play field but not the physical interaction with the play field by a player. In one example, as discussed more below, the player does not throw physical dice with the game and the hybrid craps table utilizes virtual dice or automated dice throwing mechanisms to simulate the throw of dice.

Figure 4:
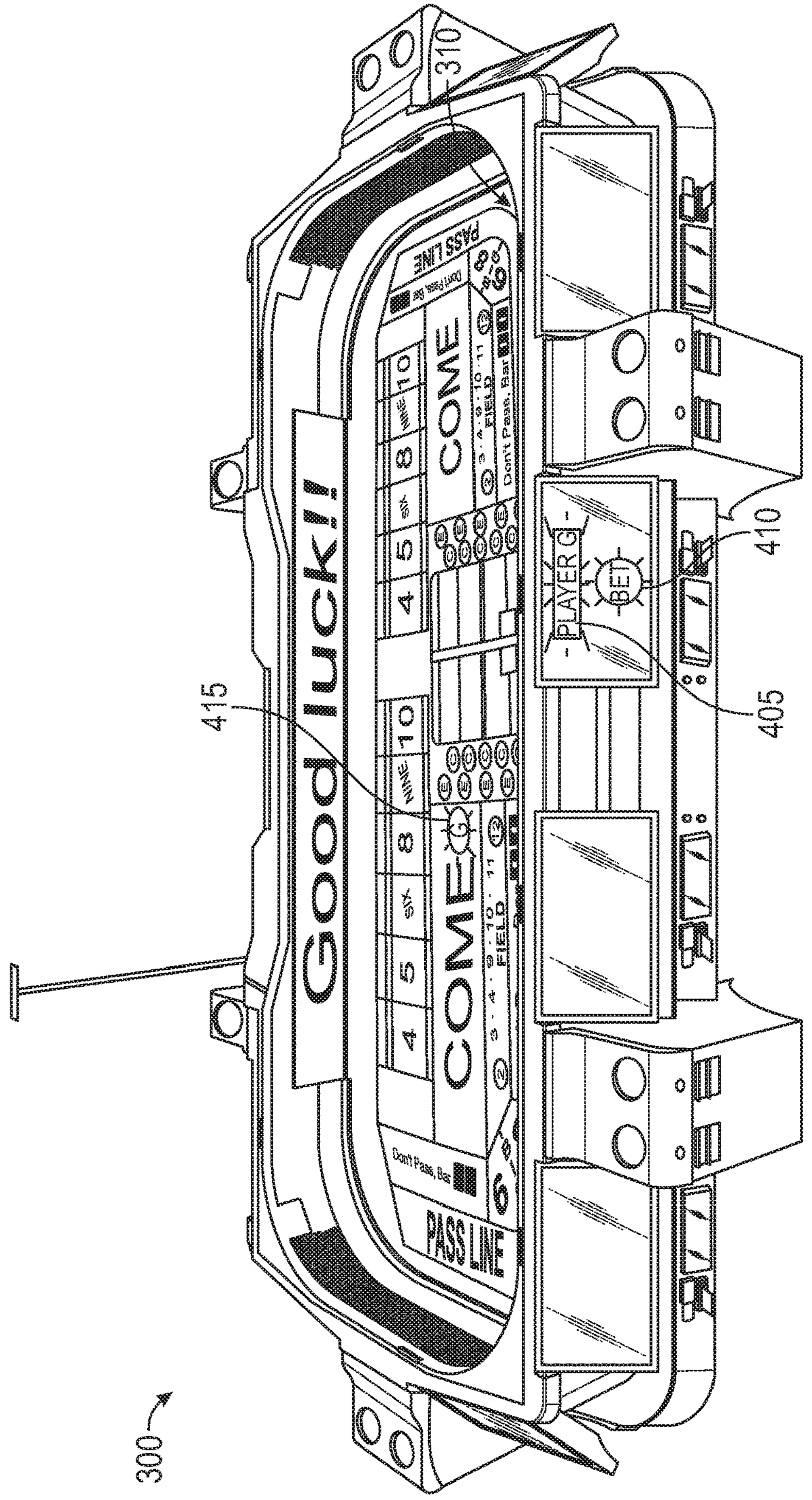
FIG. 4 is a perspective view of a hybrid craps table, illustrating an exemplary betting operation, according to one embodiment of the present disclosure.

FIG. 4 illustrates a hybrid craps table 300 in accordance with one embodiment. Such a configuration may initially appear to a player as being similar to a typical craps table with wagering areas and the play field as a whole. FIG. 4 illustrates an embodiment wherein a player utilizes a touch display to input the decision to bet, shown generally at 410. It is understood that there are several bets available to a player in craps, and a player can bet on multiple propositions offered throughout the game of craps. In one embodiment, the screen can provide a virtual representation of the craps field, and a player can make wagers by selecting the appropriate parts of the game field for their wagers. FIG. 4 provides a basic illustration of how a player may make a simple bet, and is simplified only to more easily illustrate how the present embodiment works, and should not be understood as limiting the present disclosure to only such simplified betting mechanisms.

Continuing with this example, the player has been identified as "PLAYER G" at 405. In one embodiment, a player is identified by personal information derived from the player tracking device or system, such as their name or nickname or avatar. In another embodiment, the player is identified by the particular player station they are playing from, for example as "PLAYER 5" if they are playing on a player station designated as number 5. As the player confirmed the bet by pressing the bet button 410, the play field illustrates the player bet with a virtual gaming chip 415. In one embodiment, virtual gaming chip 415 is visually associated with the player station or the player that made the wager. In the presently illustrated example, virtual gaming chip 415 is illustrated with a "G", which is associated with PLAYER G 405. In another embodiment, each player station is associated with a distinct color, and the virtual gaming chips 415 are displayed in the color of the player station that the wager is associated with. In another embodiment, virtual gaming chips 415 may be personalized based on personal information derived from the player tracking device or system. In a further embodiment, player stations are configured so that their identifying characteristics are easily viewable from other player stations. For example, if each player station is associated with a specific color, the player stations may have their associated color displayed on or near their touch display 250, and so when other players view wagers being displayed on the play field, they can more easily discern which player station, and therefore which player, is associated with that wager. This embodiment may facilitate one player copying the wagers of another player that they perceive is lucky or otherwise is a better player. It is contemplated that by visually associating virtual gaming chip 415 with the player or player station that made the wager, it makes tracking player wagers easier for the player, as they are more easily able to quickly identify where all of their wagers are.

In another embodiment, play history of individual players are viewable by other players. In one example, a first player can access the last number of rolls of a second player through their touch display 250. In another example, the field display device(s) and/or bumper display device(s) (discussed in more detail below) display historical shooting data from the player that is currently throwing the dice. In a further example, a separate display or displays are associated with hybrid craps table 300 to provide viewing of such information. In one embodiment, the historical shooting information is obtained from the game control CPU 105 in coordination with player tracking 225. For example, game control CPU 105 may provide for the logging of historical rolls, as automatically detected or as inputted by a game attendant, and facilitates that information's coordination with player identification information that is derived from the player tracking device 225. In another example, player roll history is based on the player station 115 that is rolling, rather than the individual player that is rolling. In another embodiment, an individual player roll history may be utilized for security purposes, for example to help identify statistical anomalies with individual player's rolls. In a further embodiment, a player station roll history may be utilized for security purposes, for example to help identify statistical anomalies with rolls from a particular player station.

Figure 5:
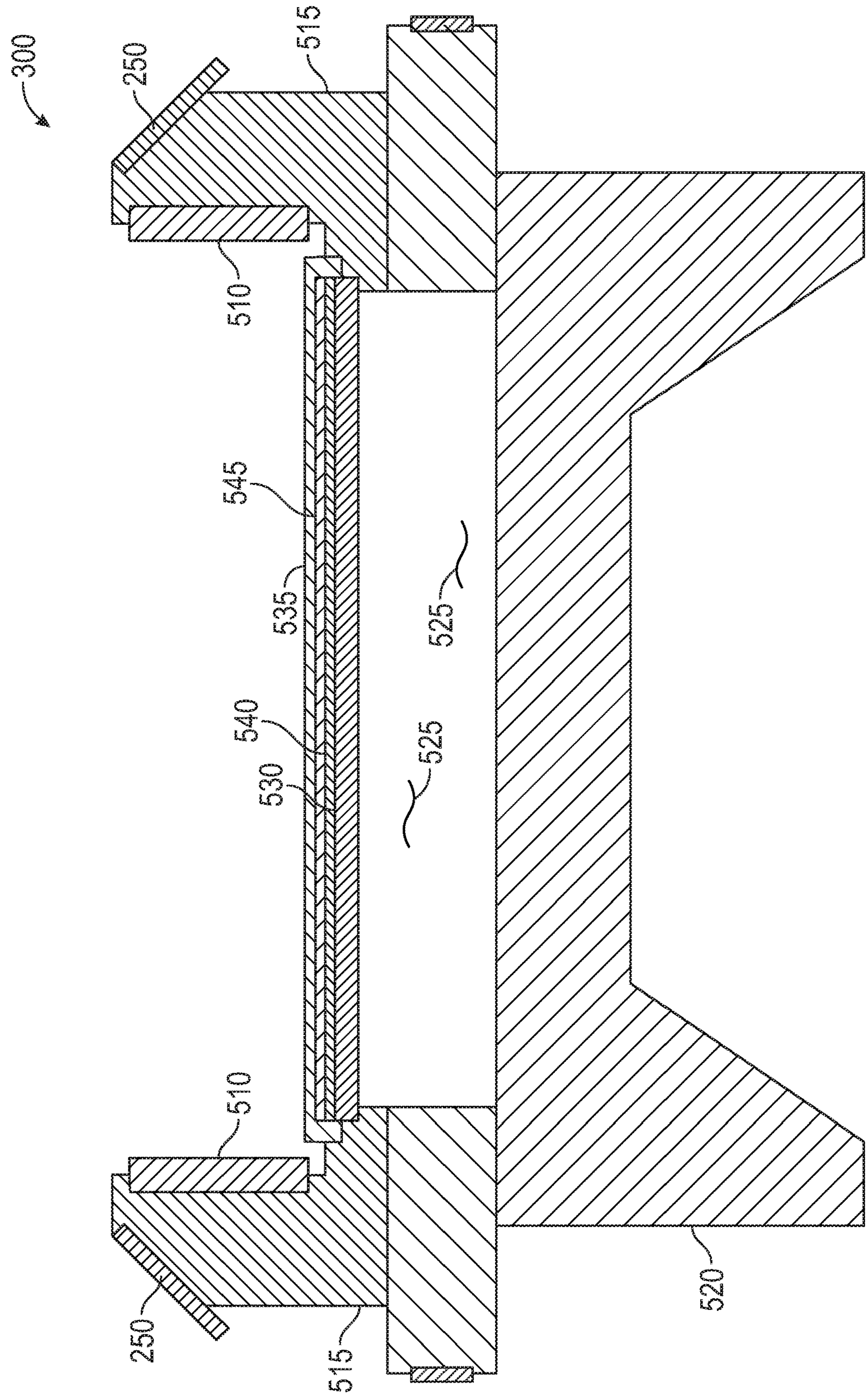
FIG. 5 is a sectional view of a hybrid craps table, according to one embodiment of the present disclosure.

FIG. 5 is a cross-sectional view of a hybrid craps table 300 in accordance with one embodiment. As can appreciated, hybrid craps table 300 can include aspects of traditional craps tables including a table base 520 and bumper walls 515. It will also include a plurality of player input devices such as touch display 250, which as discussed above, are associated with player stations.

Hybrid craps table 300 also includes a play field display device 530, which is configured to display static images, dynamic images, video images, and/or multimedia. It should be appreciated that while the discussion of the cross-sectional view of the hybrid craps table 300 discusses a field display device 530, the size of the hybrid craps table may necessitate multiple field display devices 530. It is contemplated that field display device 530 can be a flat-panel display, such liquid crystal display (LCD), light emitting diode (LED) display, a Light Emitting Diode (LED) backlit Liquid Crystal Display (LCD), organic light emitting diode (OLED) display, quantum dot light emitting diode (QLED), plasma display, or an LCD pixel matrix. It is also contemplated that other, non-flat-panel display devices can be used, such as cathode ray tube (CRT) or a projection display system such as digital light processing (DLP), LCD projector, liquid crystal on silicon (LCoS) projector, a multi-LCD laser light source projector, or any other digital projector offering good resolution (e.g., 1080p or 4K UHD). It is contemplated that in embodiments using a projection display system, the projector can be place below or above the playing surface. In one embodiment, a projector display is placed above the table, and the table comprises a standard craps table, complete with felt, except that the felt does not include any demarcations for wagering. In another embodiment, a projector display is placed above the table, and the table comprises a standard craps table, complete with felt, and the felt does include standard demarcations for wagering, but the projector is used to project the virtual betting chips, as discussed more below. In still another embodiment, a projector display is placed above the table, and the table comprises a standard craps table, complete with felt, and the projector is utilized for additional player messaging.

In the present embodiment, field display device 530 is first overlaid by a rigid protective layer 540. In one embodiment, rigid protective layer 540 is comprised of at least one glass sheet. In another embodiment, rigid protective layer 540 is comprised of plexiglass. It is contemplated that rigid protective layer 540 should be comprised of rigid, highly light-transmissive material, such as glass or plexiglass, and be sufficiently rigid to provide protection to field display device 530.

Continuing with this illustrated embodiment, rigid protective layer is overlaid with a flexible protective layer 545. In one embodiment, flexible protective layer 545 is comprised of at least one urethane sheet. In another embodiment, flexible protective layer 545 is comprised of a different elastomer material. In a further embodiment, flexible protective layer 545 is comprised of a plastic material. It is contemplated that flexible protective layer 545 should be comprised of flexible, with moderate to high light-transmissivity, material. In the present embodiment, the rigid protective layer 540 and flexible protective layer 545 assist in protecting field display device 530 from various threats that can damage it, such as thrown dice, spilled drinks, dropped glasses, or other such threats from typical casino environments.

Continuing further with this present example, flexible protective layer 545 is overlaid with play surface 535. It is contemplated that the play surface 535 can be comprised of multiple layers of different materials. In one embodiment, play surface 535 is comprised of a padding layer and a felt layer. As can be appreciated, a padding layer may be beneficial in absorbing some of the actions associated with typical craps games, including the throwing of dice. It can also be appreciated that a felt layer may help in maintaining the typical look and feel of a craps table. However, it is also contemplated that the play surface 535 can be comprised of a single material, or more than two layers of materials. It is also contemplated that play surface 535 can be comprised of clear material, substantially translucent material, or sufficiently translucent material, or a combination thereof. A clear material would allow visibility of the play field display device 530 even if it is not actively displaying anything. A substantially translucent material may somewhat distort the visibility of the play field display device 530 unless it was actively displaying something. A sufficiently translucent material may would significantly distort the visibility of the field display device 530 unless it was actively displaying something. While many textiles are contemplated for use as a play surface 535 in the present embodiment, their primary attributes should be to allow a player to view the static, dynamic, video, or multimedia presentation from the field display device 530, to provide sufficient padding so as to properly facilitate the playing of craps and the associated throwing of dice, and to be sufficiently uniform and level so as to properly facilitate the playing of craps and the associated throwing of dice.

Such textiles might include felt, linen, polyester blends, wool or wool blends, fleece, cotton or cotton blends, polypropylene, Tulle fabric or other natural or synthetic or blended textile materials. It is further contemplated that such textiles may have a base color, such as green, that is visible when the field display device 530 is off. In another embodiment, the textile material may be mostly colorless when the field display device 530 is off. In still another embodiment, play surface 535 is comprised of multiple layers. In such an embodiment, it is contemplated that each layer may be comprised of different material, material having different light transmission properties, material having different densities, material having different weights, or material having different grains.

As the field display device 530 may be large, it is contemplated that the hybrid craps table 300 has and access area, generally shown at 525. Such an area may provide access for maintenance to the field display device 530. Access area 525 may also serve as a secure area, and house sensitive components of the hybrid craps table 300.

In one embodiment, the play surface 535 is devoid of any game information, and all such game information is provided by the field display device 530, which presents such information through the play surface 535. In another embodiment, the play surface 535 may have some game information printed on it while the field display device supplements that information with enhancements or additional information. For example, an operator may desire to have standard house rules printed right on the play surface 535, so as to be clear and easily viewable, while relying on the field display device 530 to display the remainder of the game information and features. In another embodiment, play surface 535 may have most or even all of the game information printed on it, and the field display device is used primarily to display wagers (e.g., virtual gaming chips).

In another embodiment, hybrid craps table 300 does not include one or more of a rigid protective layer 540 and/or a flexible protective layer 545 and/or a play surface 535. In one example, hybrid craps table 300 includes field display device 530 which is comprised of sufficiently protective materials to minimize the need for additional protective layers. In another example, dice that are to be used with the hybrid craps table 300 are comprised of softer material so that they may be rolled directly onto a more rigid surface, such as the rigid protective layer 540 or directly onto the field display device 530. In another example, flexible protective layer 535 may provide enough visual characteristics of felt to be used without an overlaying play surface 535. In a further embodiment, hybrid craps table 300 provides different materials at different parts of the play field. For example, play field display device 530 may be provided for the majority of the play field with no play surface 535, so as to allow easier viewing of the displayed content, but the ends of the hybrid craps table 300 comprise a play surface 535, with or without any field display device underneath. In this example, it is contemplated that dice are typically thrown so as to primarily contact and come to rest at the ends of the hybrid craps table, so providing a more-typical play surface 535 at these areas maintains the desired craps play, while still allowing for the various benefits that the hybrid craps table 300 may provide as discussed herein.

FIG. 5 also illustrates bumper display devices 510, in accordance with one embodiment. It is contemplated that bumper display devices can be any of the before-listed flat-panel display devices, but may not necessarily be the same flat-panel display device as the field display device 530. For example, it may be desirable to utilize an OLED display for the field display device 530, but to then utilize and LED pixel matrix for the bumper display device. In one embodiment, it is also contemplated that the bumper display devices 510 is a separate system from the field display device 530, as discussed more below.

In one embodiment, a bumper surface may be overlaid the field display device 530, and may have a somewhat traditional, 3-D texture, perhaps similar to an egg crate padding texture for bedding. In another embodiment, a covering bumper surface has a more uniform texture, so as to possibly facilitate viewing of the content displayed by the bumper display devices 510. It is contemplated that a bumper surface should have similar attributes to the play surface in regards to allowing a player to view the static, dynamic, video, or multimedia presentation from the bumper display devices 510, and to provide sufficient padding so as to properly facilitate the playing of craps and the associated throwing of dice. However, it is also contemplated that a hybrid craps table 300 can comprise bumper display devices 510, with or without a covering bumper surface, while not including a field display device 530, as this would still provide significant improvements over a traditional craps table. Similarly, it is contemplated that a hybrid craps table 300 can comprise a field display device 530 and play surface 535 while not including a bumper display device 510, as this too would still provide significant improvements over traditional craps tables.

In the illustrated embodiment, the play surface 535 both overlays and abuts the field display device 530. It is contemplated that by doing so, the hybrid craps table 300 may have a more finished appearance, and therefore be more acceptable to traditional craps players. However, it is contemplated in another embodiment that the play surface 535 and bumper surface 505 are not distinct surfaces, but rather are comprised of the same materials and are contiguous. In another embodiment, player surface 535 only overlays, but does not abut the field display device 530.

Figure 6:
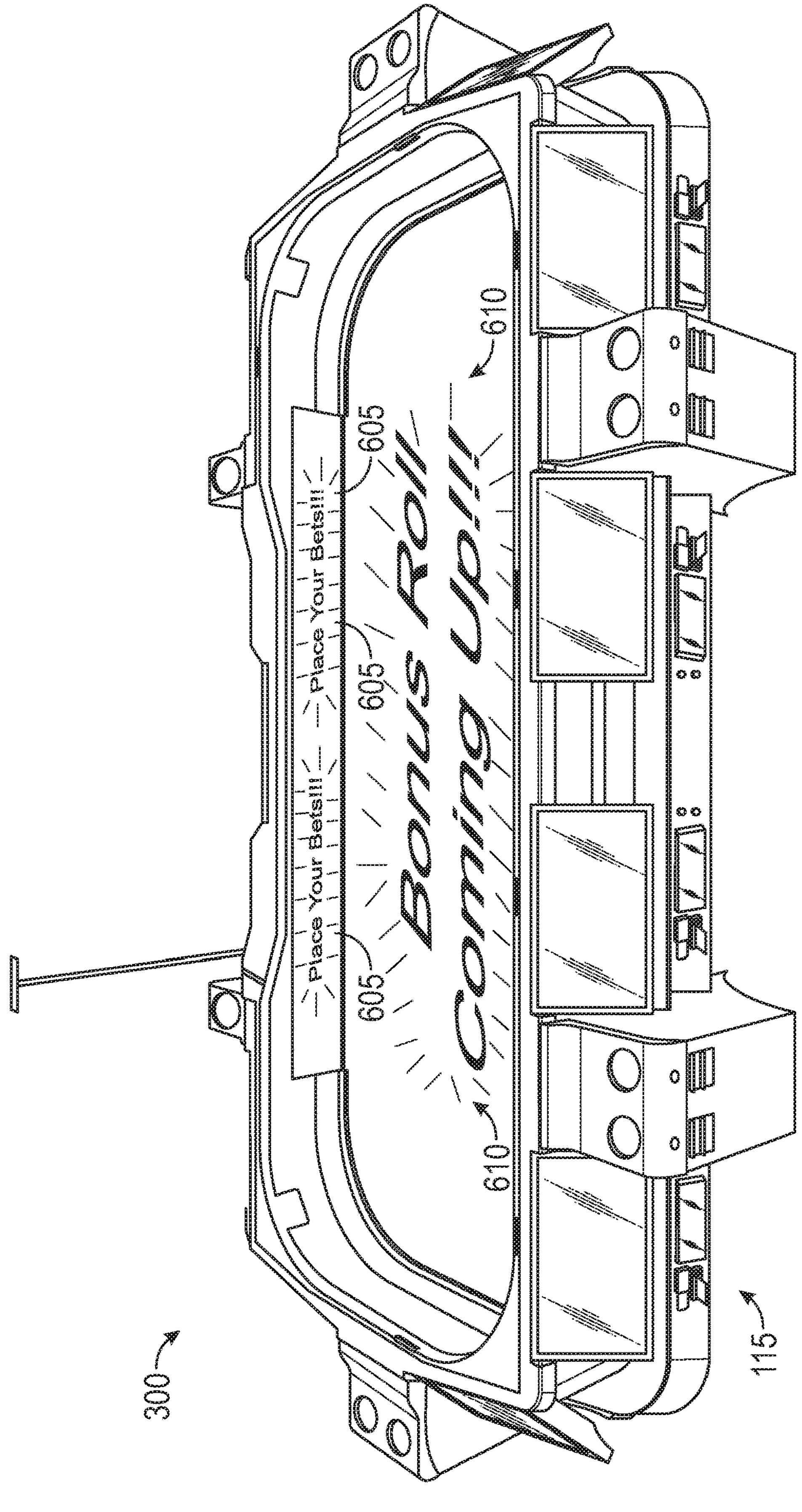
FIG. 6 is a perspective view of a hybrid craps table, illustrating exemplary messaging, according to one embodiment of the present disclosure.

FIG. 6 is another view of a hybrid craps table 300, which illustrates some of the messaging that might be displayed. For example, here the bumper message 605 highlights for players to "Place Your Bets" while the play field replaces the traditional play field with a field message 610 that a "Bonus Roll Coming Up!!!" It should be apparent that the messaging illustrated in FIG. 6 are merely examples to show the possibility of replacing the traditional, static felt of a craps table with a dynamic system that improves play characteristics, messaging, efficiencies, and security. It is contemplated that providing messaging related to a timing countdown of placing bets, either at player station 115 or the play field or the bumper display 510, or a combination of one or more thereof, helps increase the rate of play at hybrid craps table 300, and provides an express benefit to operators. One example of such an embodiment may include an automated timer, for example 25 seconds, that begins once the results of a previous dice roll have been confirmed. In such an example, the various electronic displays associated with hybrid craps table 300 may show a countdown of all or part of the timer, and when the timer expires, player stations 115 are no longer able to accept new wagers, and the shooter is instructed to throw the dice for the next play.

Figure 7:
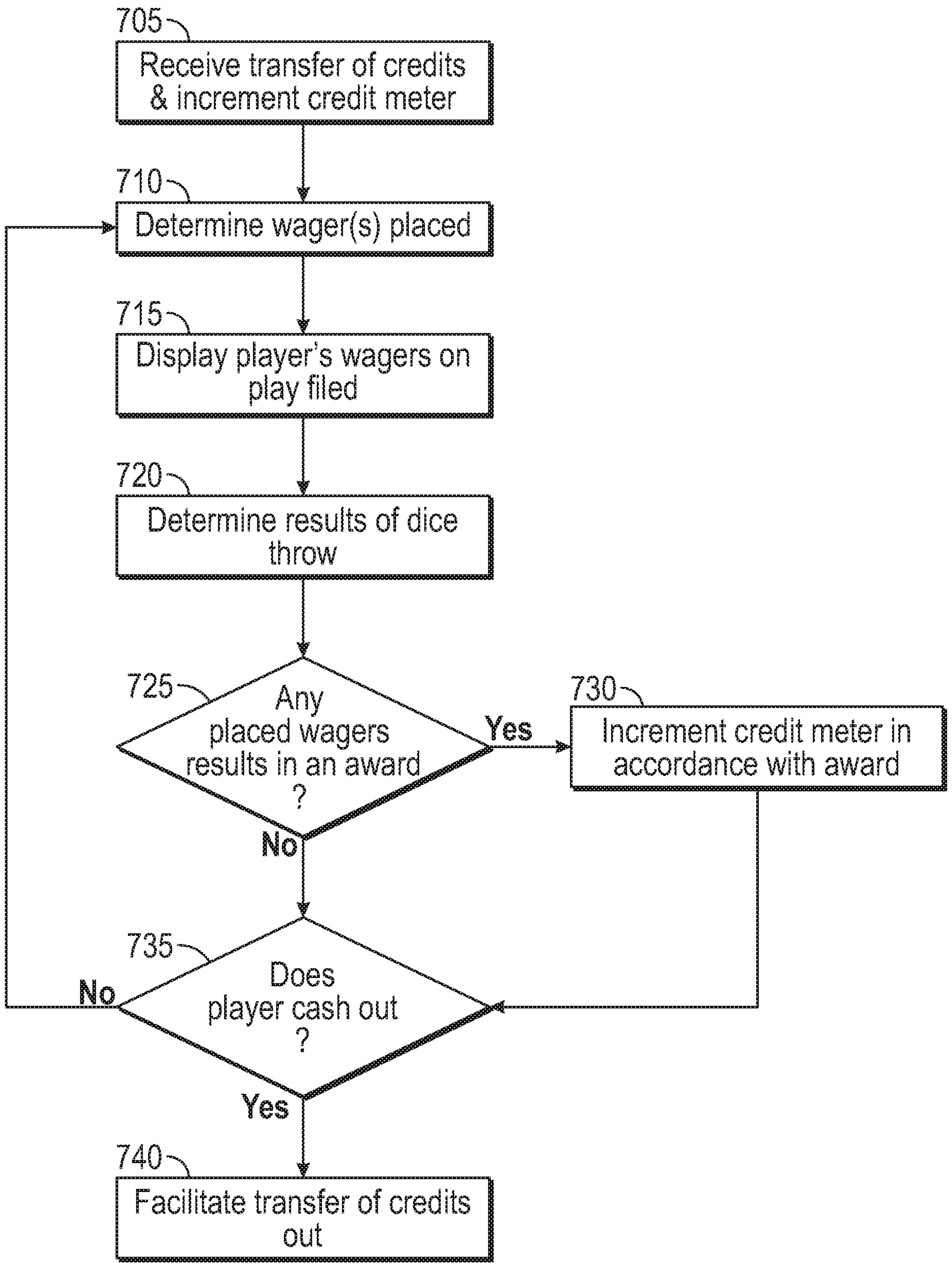
FIG. 7 is a flowchart illustrating how a hybrid craps table would operate, according to one embodiment of the present disclosure.

FIG. 7 illustrates an exemplary process for operating a hybrid craps table, according to one embodiment. Such a process may be implemented by software executed by the game controller or other processors in communication with the game controller. In this embodiment, the system receives a transfer of credits and increments a credit meter at step 705. It is contemplated that a player can transfer credits directly to their player station by inserting cash or a ticket representing a monetary value into a printer/bill acceptor, as discussed above. In one example, a ticket from a slot machine cash-out event can be used to transfer credits onto the player station of the hybrid craps table. It is also contemplated that an attendant at the table can facilitate the transfer of credits, for example, from the dealer station. It is also contemplated that the player can insert a player tracking card to facilitate the transfer of credits. It is further contemplated that the player may use a small electronic device, such as a smartphone or tablet, to facilitate the transfer of credits. In one embodiment, the credit meter is a numeric number which represents the amount of credits that are available to the player to wager. In another embodiment, the credit meter is associated with a visual display which represents the virtual chips the player has, and is able to wager. In this manner, an element of a traditional craps game may be closely replicated in that the player can see and easily verify their accumulation of chips. In another embodiment, the player station is configured to display the virtual chip information so that other players can easily view this information as well.

Next, the system determines the wager(s) placed at step 710. In one embodiment, the player station determines from the inputs received where the player had indicated to place bets. In another embodiment, the player station prompts the player to confirm the desired bets before officially finally placing the bets. In another embodiment, the player station provides a notification, for example a countdown timer, to alert the player as to when bets are no longer accepted. It is contemplated that a player can make a plurality of wagers on a plurality of different outcomes of the next dice roll.

At step 715, the hybrid craps table displays the player's wager on the play field. It is contemplated that by replicating the look and feel of a traditional craps table, which includes various player's bets on the play field, players will be more familiar with the manner of play of the hybrid craps table, and therefore be more receptive to using it. In one embodiment, each player has a unique appearance to their player chips that are represented on the play field. In another embodiment, players have the ability to customize the look of their virtual player chips, perhaps for a fee, or based on a player tracking status, or by trading in non-cashable credits awarded by a casino.

At step 720, the system determines the result of the dice throw. It is contemplated that a single attendant can both manage the table and act as the dice stickman In one embodiment, when it is determined that no further bets will be accepted, for example by a betting clock expiring, the attendant will pass the dice to the shooter, and monitor the throwing of the dice. Once the dice come to rest, the attendant will then view the results of the roll, and input the results into the dealer station. In another embodiment, the dealer station will have a simplified graphical user interface (GUI) in order to accelerate the input of the results while also minimizing the chance for inputting the incorrect result. For example, the GUI may comprise two sections which each show six virtual representation which represent each possible dice roll for a single dice. In such an example, the attendant would then just have to select a virtual dice from each section which matches the actual dice roll.

In another embodiment, the dealer station may prompt the attendant to confirm the result prior to finalizing the result. In another embodiment, the hybrid craps table is associated with an automated dice recognition system, which may comprise specialized cameras and specialized software. In another embodiment, such an automated dice recognition system may comprise communication circuitry within the dice, which are configured to communicate with a complimentary electronic system located in close proximity to the play field. The communication can be by way of, for example, WiFi, Bluetooth, NFC, RFID, accelerometers, or other similar manners. In such embodiments, it is contemplated that the results of the dice throw are automatically tracked an communicated to the system.

In an example of an embodiment comprising an automated dice recognition system which utilizes RFID, RFID tags are embedded on each face of the dice utilized in the play of a game. In continuing with this example, one or more RFID readers are located near the play field, and are configured to flow current to an associated antenna or antennas based on instructions received from an associated controller or the came control CPU 105, which causes the transmittal of a predetermined command to the RFID tags. In one example, such antennas are loop-shaped. Then, a magnetic field is altered within the area surrounded by the antenna or antennas in which the current flowed. Along with the alteration of magnetic flux in this magnetic field, electromotive force is generated within the antenna that is included in the RFID tag which is disposed within the area. Herewith, electric power is transmitted to the RFID tag, whereby communication with the RFID tag is performed.

In another embodiment, several antennas are associated with each RFID reader. In one example, each such antenna is positioned so that at least a portion of each of the detection areas are overlapping. In a further embodiment, dice having RFID tags also comprise one or more accelerometers. In one example of such an embodiment, the accelerometers are configured to communicate with the dice recognition system when the associated dice does not land fairly on the play surface, for example, when a dice lands resting at an angle against a bumper wall.

In another embodiment, an automated dice recognition system is located only at one end of the hybrid craps table, and would require that all throws occur from the opposite end of the hybrid craps table. In another embodiment, one or more automated dice recognition systems are positioned to detect dice at both ends of the hybrid craps table.

At step 720, the system compares the results of the dice throw with the wagers placed, to determine if any wager results in an award. It should be understood that in the game of craps, any single dice throw may not result in the resolution of each wager placed or were pending on that dice throw. However, after each dice throw, the system must determine if any particular wager results in an award. If there is a determination that a wager results in an award, the credit meter is incremented in accordance with the award at step 730.

At step 735, if the player station receives an input from the player indicating a cash-out, the player station will then facilitate the transfer of credits out at step 740. In one embodiment, such a transfer might be by way of a printed ticket, from the printer/bill acceptor peripheral, which represents the amount of credits the player is cashing out. In another embodiment, the transfer might be by way of electronic transfer to an account the player has access to. For example, the transfer might be to the player's smartphone or table, player's account managed by the casino, or bank account.

If the player does not cash out at step 735, the process returns to step 710 to determine if the player places any additional wagers. As discussed above, it may take several rolls of the dice before the player's initial wagers are resolved, so it is contemplated that a player may remain actively playing on the hybrid craps table without having to place a new wager for every roll of the dice.

Figure 8:
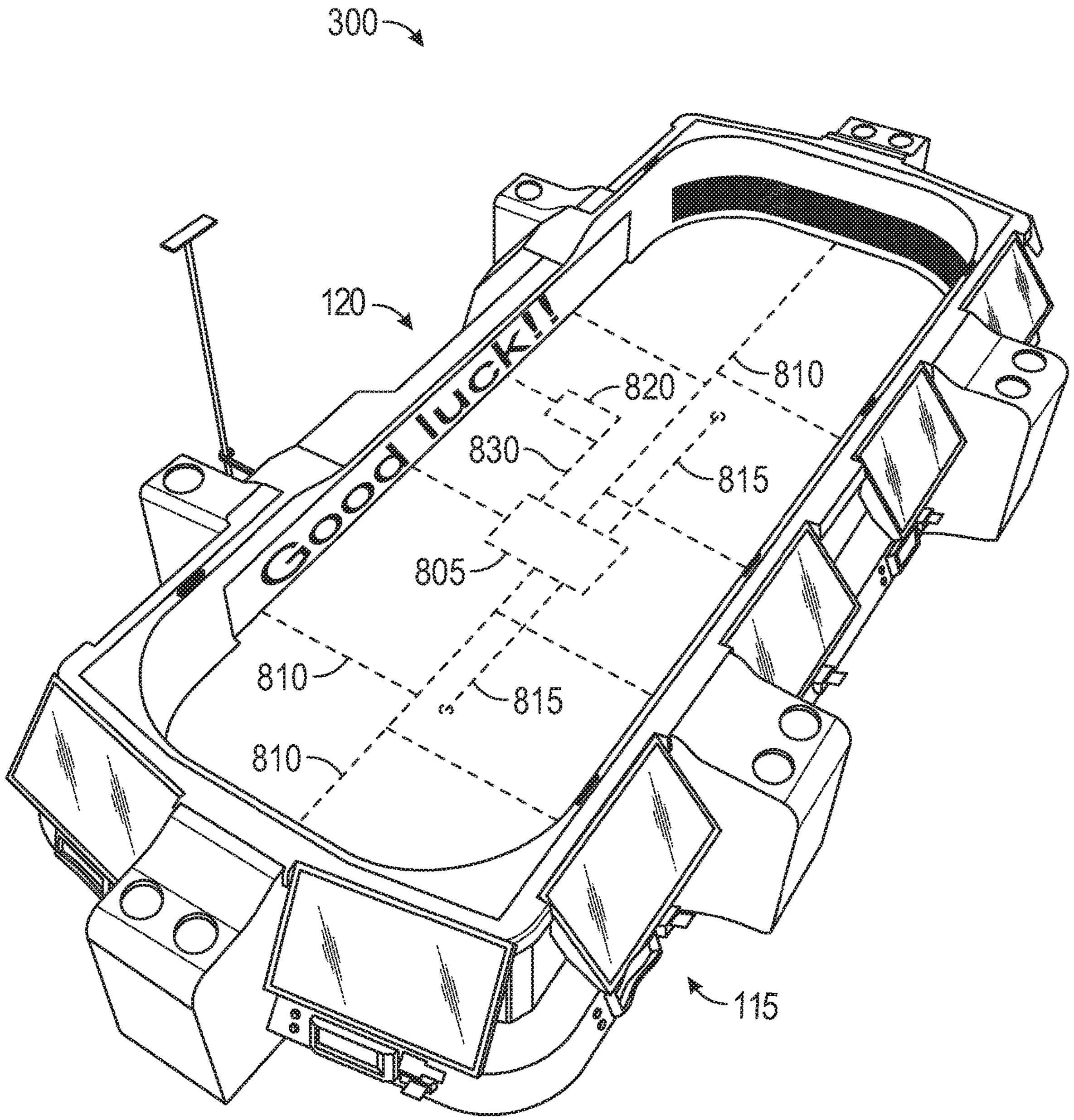
FIG. 8 is a perspective view of a game controller layout of a hybrid craps table, according to one embodiment of the present disclosure.

FIG. 8 provides a simplified controller layout of the hybrid craps table 300 in accordance with one embodiment. In the present disclosure, the hybrid craps table 300 has a plurality of player stations 115 and a dealer station 120. Located beneath the table surface, a game controller 805 is in communication with various components of the hybrid craps table 300, as illustrated by the dashed lines. For example, the game controller 805, or game control CPU, may be in communication with each of the player stations 115, as generally indicated by communication lines 810 going to the general vicinity of player stations 115. Game controller 805 is also in communication with the dealer station 120. Further, game controller is in communication with the field display devices, as indicated by communication lines 815.

In the present embodiment, a separate bumper display controller 820 is illustrated, which is in communication with the bumper display device. As further illustrated, the bumper display controller 820 may be in communication with the game controller 805. As can be appreciated, and as discussed in more detail below, it is contemplated that in some embodiments, the game controller may communicate directly with the bumper display device, so there would be no need for the bumper display controller 820. In other embodiments, the bumper display system is completely separate, so there would be no direct communication line 830. However, in this FIG. 8, communication line 830 is being shown to provide an example of one embodiment where game controller 805 is not in direct communication with the bumper display device, but does have a communication line which might allow for coordination of certain displays.

In the present embodiment, it is contemplated that the bumper display device can be managed separately from the game controller 805, which may be desirable by operators. However, through communication line 830, it is still possible to coordinate certain display, perhaps for a bonus or other game feature. It is further contemplated that bumper display controller is a specialized controller in order to manage the bumper display, which again, may be a different type of display from the field display devices. It can be appreciated that having specialized display controllers may provide for easier maintenance of the overall hybrid craps table.

Tutorials

One improvement that the present disclosure contemplates is the ability to more-easily teach players the rules and etiquette of the game of craps. For example, with the contemplated system, a player may be able to select a "Tutorial" or "Help" button on their player station, which can provide text, videos, or a combination thereof, to help players learn the game of craps. In one embodiment, it is further contemplated that coinciding with a player's interaction on their player station, the play surface changes its display, such as highlighting certain aspects of the play surface, to help connect the play between what the player is doing on their player station and how it relates to the play field. In another example, a player is able to highlight a particular wager option at their player station, and request additional information on the wager. In such an example, the player station may be configured to provide a text or video display which helps explain how a particular wager is resolved.

In another embodiment, a player is allowed to play a tutorial session of craps for free or a reduced cost. One example of this embodiment may be that a player is offered an allotment of non-cashable credits (e.g., $100) to wager on the next several plays of the craps game. In one example, the play may pay an upfront, non-recoupable fee for this tutorial session. In another example, the player may be offered this session via a casino-offered incentive, perhaps through a player tracking device on another gaming machine. In still another example, the player may be allowed a limited number of such tutorial sessions, which may be monitored via the player tracking device at the player station and/or player tracking system at the casino. In a further example, the player may redeem player tracking rewards in exchange for non-cashable credits. In another example, the player is allowed to wager these non-cashable credits freely on the player of the craps game. In a further example, the player may be instructed by the display device at their player station where to wager the non-cashable credits. In another example, the player station (via the display) provides additional information about the possible wagers, made wagers, payouts, and/or other aspects of the gameplay. In another example, the player may have a limited amount of time to participate in the tutorial session (e.g., 20 minutes).

Bonus Games

Another improvement contemplated is the ability to provide new bonus games to craps players. Traditionally, craps did not lend itself to bonus games, except maybe for the occasional side bet, as the outcome of craps game was limited to the results of the dice roll, and conveying new bonus concepts to players was difficult. However, with the ability to transform the visual aspects of the play field, combined with the ability to provide information to players via the player stations, new and exciting bonuses now become feasible to do. One example might be to quickly change the color of the entire field, to symbolize that the next roll is a bonus roll and extra awards are possible. Another example might be to cause the entire field, and even the bumper, to reflect a large gaming wheel, that spins and awards the various players at their player station awards based on the result that ultimately is indicated by the position of their player station. Another example is to randomly, or based on approved criteria, highlight a certain bet that may pay extra if it is hit within a certain number of dice throws. Another example is to change the color of the game field to reflect streaks, or bonus levels as they are obtained as related to streaks. For example, it might be that the standard background color of the field is green, but as a streak shooter hits 25 rolls, the background color changes to blue, and at 35 rolls, it changes to red, etc. As is evident, there are many possibilities for bonusing players based on the ability to quickly and easily change the display of the craps play field. It is contemplated that these bonuses may be funded from actual wagers on the hybrid craps table, funded through player tracking marketing monies, or funded by 3rd-party advertisers.

Similar to bonus games, it is contemplated that the disclosed hybrid craps table is well-suited for tournaments. Historically, tournaments for craps are not very common as it requires significant overhead, with multiple casino personnel required to run the tournament and the slow play associated with typical craps games. It is contemplated that the improvements disclosed herein, which improve efficiencies of running a craps table, also provide efficiencies in running tournaments for the play of craps. In on example, the field display device(s), the bumper display device(s), and/or the player station are configured to display tournament standings. In another example, such tournaments are time-limited, for example one hour. In a further example, such tournaments are roll-limited, for example, 60 consecutive rolls of the dice. In another example, such tournaments are played with non-cashable credits. In another example, such tournaments are played with monetary credits. In a further example, such tournaments require that each participant act as the shooter. In another example, such tournaments do not require each participant to act as the shooter.

In another embodiment, the hybrid craps table provides a persistence wagering bonus game. For example, the added automation of the hybrid craps table as disclosed herein allows an operator to track individual player wagering more closely, which then enables the ability to offer bonus games based on persistence wagering over a set number of plays of craps. In one example, for every twenty consecutive rolls that a player has an active wager on, the hybrid craps table may provide a play of a separate random event. For example, the touch display may display a small wheel that spins, and provides an opportunity for the player to win an award. In another example, non-cashable credits may automatically be added to a player's credit meter or pending wagers. It is contemplated that various types of persistence wagering bonus implementations are now available to an operator due to the hybrid craps table disclosed herein.

Advertising

It is contemplated that the ability to quickly change the displays associated with a hybrid craps table, casinos can more easily take advantage of the viewable "real estate" associated with the craps table. For example, operators can quickly add or remove advertisements for on-casino attractions. Another example would be to utilize the bumper displays to show advertisements, perhaps in a scrolling manner. This would also allow operators to change the advertisements based on criteria, such as time of day, length of display, profiles of current players (as possibly determined via the player tracking system), time of year (e.g., holiday seasons), special events happening at or near the operator or casino, wagering occurring at the hybrid craps table, etc. For example, it is contemplated that the advertising can be personalized based on the profiles, as determined from the player tracking system, of the current players playing at the hybrid craps table. In another example, the system can select specific advertising based a profile associated with the player currently wagering the most at the hybrid craps table. In a further example, advertising can be personalized based on the top-wagering predetermined number of players, for example the four players having the highest wagering rate over the last ten minutes. It is contemplated that advertising can be more focused based on the integrated nature of the hybrid craps table as disclosed herein.

Separate Display Systems

It is further contemplated that the display system associated with the field display device(s) is separate from the display system associated with the bumper display device(s). As the field display devices are associated with a regulated casino game, operators may not have the authority to easily change what is displayed on the play field, without first receiving regulatory approval. However, as the bumper display devices are not typically associated with a critical aspect of the game play, operators might have the authority to change these displays more easily. In such embodiments, it is contemplated that an Operator can then use the bumper displays for advertising, player loyalty bonusing/programs, or other casino offerings or messaging. In other embodiments, it is contemplated that the two systems may operate separately for certain activities, but still be in communication and configured to operate together for certain other activities. For example, during normal craps play, the field display devices will display activities associated with the craps game, while the bumper display devices display advertising as approved by the casino, but then during a bonusing period, both sets of displays will work together to display information related to the bonusing period. Additionally, the bumper display system may work in operate with the game field in between rolls of the dice to inform player to place bets or provide information related to roll history. For example, the bumper display may identify the results for each of the last number (e.g., 10) rolls. Another example may be that the bumper display identifies the number of rolls since certain outcomes have occurred (e.g., craps, etc.). Another example might be the history of rolls related to the current shooter. These roll histories can also be displayed at the individual player stations, so that players have easy access to them. These roll histories can also be displayed on the game field.

Alternative Games

In one embodiment, the hybrid craps table is configured as a hybrid gaming table, and is configured to easily convert into another style of wagering game. For example, it is contemplated that a hybrid gaming table can easily change its appearance and convert to a traditional table horse-racing game, as are known in the industry. As the tables of a craps game and a horse-racing game can roughly be the same size and shape, the change of the field display from a craps game to a horse-racing game would not cause much confusion. This embodiment would provide additional flexibility and efficiencies for casino operators, who would then be able to reconfigure the hybrid gaming table according to particular customer demands In another embodiment, the hybrid gaming table can function as a Sic Bo gaming table. In one example, such a Sic Bo game can allow a player to throw the physical dice. Current commercial implementations of Sic Bo do not allow the player to throw the dice, as this process is typically completely automated. It is contemplated that the present disclosure provides a particular benefit in allowing the player to throw physical dice, thereby increasing player participation and enjoyment of the traditionally fully automated game. In another embodiment, the hybrid gaming table can function as a racing game, similar to a horse-racing game, but displaying different racing elements, such as cars, chariots, boats, or other racing elements. In another embodiment, the hybrid gaming table primarily functions as a game other than craps, such as Sic Bo. In a further embodiment, the hybrid gaming table only functions as an alternative game, such as Sic Bo.

Security

It is contemplated that security of traditional craps tables are greatly improved with a hybrid craps table. Instead of players having physical chips that they wager, or sometimes toss to game attendants, they now can place all of their wagers via their player station. Additionally, since the hybrid table can dynamically change the display of the play field, the play field can be updated to reflect various wagers by players. It is also contemplated that player stations may include a printer/bill acceptor, which would allow the table to operate in a cashless manner, as it common on slot machines. It is contemplated that this would prevent mistaken loss of casino chips and/or the intentional misuse of casino chips.

In one embodiment, a high-speed camera is associated with the hybrid craps table to monitor the dice rolls. In another embodiment, a plurality of high-speed cameras are associated with the hybrid craps table to monitor the dice rolls. In a further embodiment, a plurality of high-speed cameras are positioned to provide a stereoscopic view of a dice roll. In one example, the high-speed camera assists in the logging of rolls, so that they can be monitored in real-time or logged for later monitoring, and reviewed for security purposes (e.g., inconsistent rolls, unusual patterns, etc.). In another example, the high-speed camera or cameras are utilized for an automated dice recognition system, as discussed more above. In another embodiment, the feed from the high-speed camera can be relayed to the player stations and/or the dealer station, so that the roll can be visually reproduced on their respective displays. In one example, a player station may be caused to reproduce a roll in slow motion which may provide added anticipation and excitement for a player.

Simulated Dice Throws

In one embodiment, a high-speed camera is associated with the hybrid craps table to monitor the throwing motion of the dice by a player. In one example, the player is not give physical dice to throw, but rather is instructed when they are allowed to throw, and performs a throwing motion. In such an example, the high-speed camera, or cameras, track the player's motion, and causes an automated dice roll to occur in coordination with the detected throwing motion.

In one embodiment, the automated dice roll is a roll of virtual dice, which are caused to be displayed on the play surface. In one example, the results of the virtual dice roll are determined by an RNG or pseudo-RNG. In one such an example, the system receives at least one random number from an RNG. The system then utilizes the random number or numbers to determine the results of the dice roll, and causes the virtual dice to display such results. In another example, the detected throwing motion triggers the request by the system to receive at least one random number from the RNG. In a further example, each virtual dice is associated with a distinct random number, so the system receives two generated random numbers and associates each with received random number with a distinct result for each dice.

In another embodiment, the automated dice roll utilizes physical dice. In one example, the hybrid craps table is configured to shake the dice on a dice shaker. In another example, the hybrid crapes table is configured to shoot the dice from a position close to the player who is the acting shooter. In such an example, it is contemplated that the hybrid craps table would further comprise an automated dice retrieval system, which would be configured to collect the thrown dice, and return them to the automated dice throwing system. In a further example, the automated dice throwing system may utilize compresses air to launch the dice. In another example, the automated dice throwing system may utilize mechanical means to launch the dice, such as a spring or lever action.

Efficiencies

It is contemplated that several of the embodiments taught herein will provide efficiencies to operators. For example, it is contemplated that a hybrid craps table will only require a single dealer/attendant, as opposed to the two to three attendants currently required to run a traditional craps table. Further, it is contemplated that without the need to accurately track and account for physical betting chips, the casinos will see a significant reduction in the working hours required to transport and account for such physical chips. Other anticipated efficiencies include the ability to more accurately track player activities as they relate to player tracking programs. It is further anticipated that since payouts will be automated, game play speed will be improved as there will be less down time as attendants are not required to go around and collect or payout chips on each of the wagers. These efficiencies, and combined with the contemplated improved security, should make hybrid craps tables very attractive to operators.

Player Interaction

In one embodiment, the player station provides the player the ability to communicate with other players and/or the dealer electronically. In one example, the touch display of the player station may include a "Good Job" button that a player may press when they want to congratulate the shooter, and that message is conveyed to the player station of the shooter. In another embodiment, the touch display of the player station may include a "Tip" button which allows the player to tip the game attendant. Another embodiment includes the ability to type and send short messages to other player stations.

Hot Streaks

In one embodiment, it is contemplated that the hybrid craps table highlight players that have had successful shooting streaks. For example, when the table attendant hands the dice to a new roller, the attendant may associate the dice with a particular player station via an input at the dealer station (e.g., player station #3 is the shooter). This may in turn cause a visual indication proximate to that player station indicating that this is a new shooter (e.g., a blue glowing effect). As that shooter continues to shoot, and becomes a streaking or hot shooter, they visual indication may automatically change based on the consecutive number of throws and the associated outcomes of the throws. So for example, as a shooter becomes a hot shooter, the visual indication may turn from a blue glow, to an orange glow, to a red glow, to fire graphics. It is contemplated that such a system would incentivize players to try and reach various levels associated with a hot streak, while also providing valuable information to other potential players, as it is believed that many players search various craps tables for hot players. It is contemplated that this aspect can provide significant benefits over traditional craps tables.

Software

Reference to software in the present disclosure may encompass one or more computer programs that may encompass data, instructions, or both.

One or more tangible and non-transitory computer-readable media may store or otherwise embody software implementing particular embodiments. A tangible computer-readable medium may be any tangible medium capable of carrying, communicating, containing, holding, maintaining, propagating, retaining, storing, transmitting, transporting, or otherwise embodying software, where appropriate. A tangible computer-readable medium may be a biological, chemical, electronic, electromagnetic, infrared, magnetic, optical, quantum, or other suitable medium or a combination of two or more such media, where appropriate. Example tangible, non-transitory computer-readable media include, but are not limited to, application-specific integrated circuits (ASICs), compact discs (CDs), field-programmable gate arrays (FPGAs), floppy disks, floptical disks, hard disks, holographic storage devices, magnetic tape, caches, programmable logic devices (PLDs), random-access memory (RAM) devices, read-only memory (ROM) devices, semiconductor memory devices, and other suitable computer-readable media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose or specific-purpose computer system may execute software implementing particular embodiments, where appropriate.

Further examples are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure.

What is claimed is:

1. A dice game system comprising:

a play field comprising:

at least one play field display device arranged horizontally so that images displayed by the at least one play field display device are viewable from directly above the at least one play field display device;

a rigid protective material positioned directly above the at least one play field display device;

a play surface comprised of textile material, the play surface positioned adjacent to the rigid protective material;

a bumper wall positioned adjacent to the play field, the bumper wall comprising:

at least one bumper display device arranged vertically; and a bumper surface comprised of padding material;

a plurality of player stations, each player station comprising;

at least one player station memory device;

a player station touchscreen; and at least one player station processor in communication with the at least one player station memory device and the player station touchscreen;

a dealer station, the dealer station comprising:

at least one dealer station memory device;

a dealer station touchscreen; and at least one dealer station processor in communication with the at least one dealer station memory device and the dealer station touchscreen;

at least one game controller memory device; and at least one game controller processor, which is configured, with the play field, the bumper wall, the plurality of player stations, the dealer station, and the at least one game controller memory device to:

cause the at least one play field display device to display through the play surface a dice game wagering area;

receive a communication from at least one player station of the plurality of player stations indicating a wager on a next play of the dice game;

cause the at least one play field display device to display through the play surface a representation of the received wager;

cause at least one of the at least one play field display device, the at least one bumper display device, and the dealer station, to display an indication that physical dice may be thrown by a player;

receive a communication that indicates the results of thrown physical dice;

determine the results of the received wager based on the results of the thrown physical dice and cause a credit meter associated with the at least one player station to increment when the determined results of the received wager is a winning determination.

2. The dice game system as defined in claim 1, wherein the at least one play field display device is a Light Emitting Diode (LED) backlit Liquid Crystal Display (LCD).

3. The dice game system as defined in claim 1, wherein the at least one bumper display device is a Light Emitting Diode (LED) backlit Liquid Crystal Display (LCD).

4. The dice game system as defined in claim 1, wherein at least one of the plurality of player stations includes a player tracking device that is configured for communication with a casino tracking system to track a player's play.

5. The dice game system as defined in claim 4, wherein the player tracking device includes a player tracking card reader.

6. The dice game system as defined in claim 1, wherein the plurality of player stations each further comprise:

a credit meter; and a printer/bill acceptor configured for accepting a physical indicium of an amount of currency.

7. The dice game system as defined in claim 6, wherein the printer/bill acceptor is configured to interact with a wireless credit device which transmits financial information about a player to the printer/bill acceptor.

8. The dice game system as defined in claim 1, wherein the at least one game controller processor is configured to cause the at least one play field display device to display through the play surface a Craps dice game wagering area.

9. The dice game system as defined in claim 1, wherein the at least one game controller processor is configured to cause the at least one play field display device to display through the play surface a Sic Bo dice game wagering area.

10. The dice game system as defined in claim 1, the play field further comprising:

a flexible protective layer positioned between the rigid protective material and the play surface.

11. The dice game system as defined in claim 1, wherein the textile material of the play surface comprises tulle fabric.

12. The dice game system as defined in claim 1, wherein each of the plurality of player stations is moveably mounted to the bumper wall.

13. The dice game system as defined in claim 1, wherein the at least one bumper display device includes a bumper display device controller in communication with the at least one game controller processor for causing the bumper display device to display third-party advertising information.

14. A method of controlling a dice game system, the method comprising:

causing a display field of the dice game system to display a dice game wagering area, wherein the display field comprises a flat panel display, a rigid protective material adjacent to the flat panel display, and a play surface adjacent to the rigid protective material;

receiving an electronic communication at a game controller processor of the dice game system indicating a wager on a next play of the dice game;

causing the display field to display a representation of the received wager on the dice game wagering area;

indicating on at least one of the display field, a bumper display device of the dice game system, or a dealer station of the dice game system that physical dice may be thrown by a player;

receiving an electronic communication at the game controller processor that indicates a result of thrown physical dice;

determining a result of the received wager at the game controller processor based on the result of the thrown physical dice; and incrementing a credit meter of the dice game system when the determined result of the received wager is a winning determination.

15. The method of controlling a dice game system as defined in claim 14, wherein the display field is caused to display the dice game wagering area for a Craps game.

16. The method of controlling a dice game system as defined in claim 15, further comprising causing the bumper display device to display a wager timer which counts down a time to place a wager.

17. The method of controlling a dice game system as defined in claim 14, wherein the display field is caused to display the dice game wagering area for a Sic Bo game.

18. The method of controlling a dice game system as defined in claim 14, further comprising causing the bumper display device to display non-game information.

19. The method of controlling a dice game system as defined in claim 18, wherein the non-game information caused to be displayed on the bumper display device is third-party advertising information.

20. The method of controlling a dice game system as defined in claim 18, further comprising displaying tutorial information related to the type of dice game on the bumper display device.

* * * * *